Oct. 6, 1964

C. E. SLOOP 3,151,924

METER SOCKET ASSEMBLIES

Filed Dec. 1, 1960

INVENTOR.
CLIFFORD E. SLOOP
BY
ATTORNEY

Oct. 6, 1964  C. E. SLOOP  3,151,924
METER SOCKET ASSEMBLIES
Filed Dec. 1, 1960  2 Sheets-Sheet 2
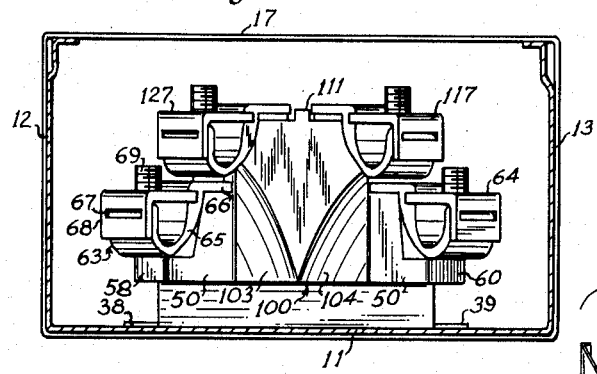
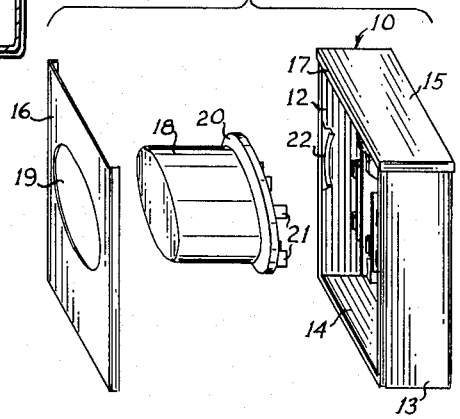
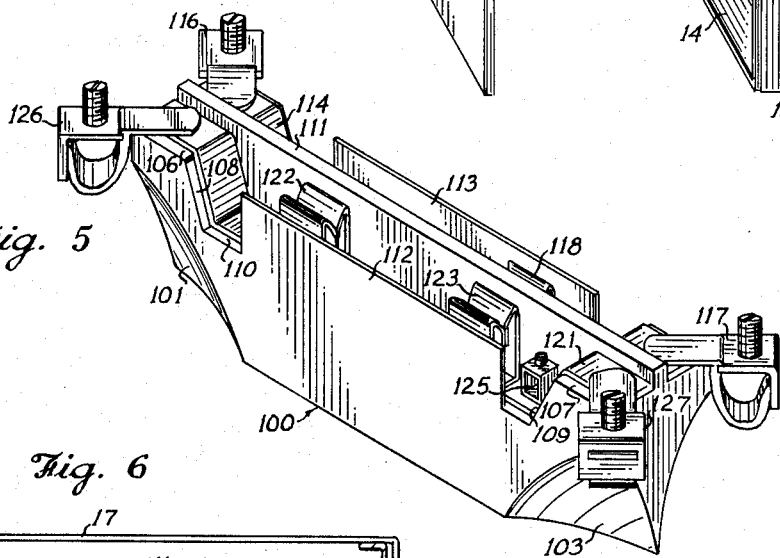
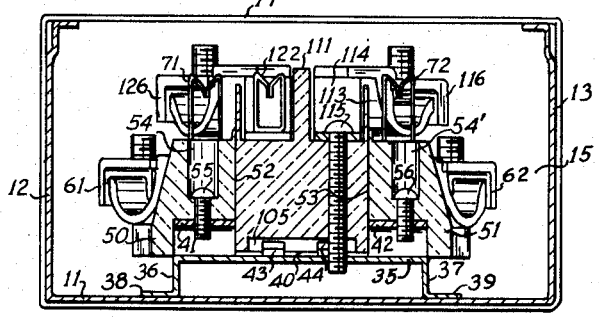
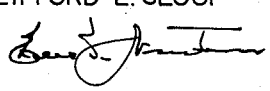
*INVENTOR.*
CLIFFORD E. SLOOP
BY
ATTORNEY

United States Patent Office 3,151,924
Patented Oct. 6, 1964

3,151,924
METER SOCKET ASSEMBLIES
Clifford E. Sloop, 2230 10th St., Columbus, Ga.
Filed Dec. 1, 1960, Ser. No. 73,135
11 Claims. (Cl. 339—31)

This invention relates to meter socket assemblies, and is more particularly concerned with a polyphase adapter by which a conventional lightweight single phase socket may be converted into a heavy duty meter socket assembly such as used in three phase wiring.

The electrical circuits in many buildings are designed to carry very heavy loads; however, the actual electrical power used is far below the rated capacity of the wires used in the electrical service to the building. In such cases, due to the large diameter wire used, the meter socket installed must correspond to the anticipated load rather than the actual load, though the cost of such a heavy duty meter socket is considerably higher than the lighter socket which would carry the actual electrical load.

In the past, heavy duty wires have been installed in light duty meter sockets; however, the undue stress on the insulator block of the meter socket caused by the heavy wires may result in breakage of the porcelain insulator block, or the application of sufficient stresses to the block that light blows to the block will result in such breakage. The stresses referred to are caused by the fact that the large diameter wires are forced to assume small radius bends to conform to the limited space within the meter box, and to assume an unnatural relationship with respect to the entering conduit or cable.

The meter socket of the present invention overcomes the above mentioned undesirable qualities by providing a relatively light duty meter socket which has the terminals thereof so arranged as to allow the entering conductors to maintain the same relationship with respect to one another throughout the conduit and as they emerge from the end thereof, requiring only large radius bends of the conductors in order to reach the terminals and being engaged for current carrying purposes, once they are in the terminals. The device of the present invention is readily adaptable as a conversion unit or adapter to be used in conjunction with a prior art single-phase meter socket, though the meter socket assembly may, of course, be manufactured as a complete unit.

It is therefore an object of the present invention to provide a light duty meter socket assembly which will receive heavy duty conductors without being damaged thereby.

It is another object of the present invention to provide a meter socket assembly which will allow large diameter conductors to enter and be attached by the terminals of the socket using only large radius bends in the conductors.

Another object of the present invention is to provide a three phase meter socket assembly, the terminals of which require the entering conductors to remain in their natural relationship with respect to the cable or conduit.

Another object of the present invention is to provide a meter socket assembly in which the terminals thereof are so positioned with respect to the cables leading thereto that the assembly requires that the cables be prearranged within the conduit according to a code.

A further object of the present invention is to provide a terminal block attachment suitable for installation in a prior art single phase meter socket to adapt the socket to receive heavier cables such as those used in three phase electrical service.

A further object of the present invention is to provide a three phase meter socket assembly which is durable in structure, simple to install, and economical to manufacture.

Other and further objects, features and advantages of the present invention will become apparent from a consideration of the following specification taken in conjunction with the accompanying drawings in which:

FIG. 3 is a cross sectional view taken substantially along the line 3—3 of FIG. 1.

FIG. 4 is a perspective exploded view, on a reduced scale, of the meter socket assembly of the present invention.

FIG. 5 is a perspective view of the conversion unit attachment of the present invention.

FIG. 6 is a cross sectional view taken substantially along the line 6—6 of FIG. 1.

Figure 1:
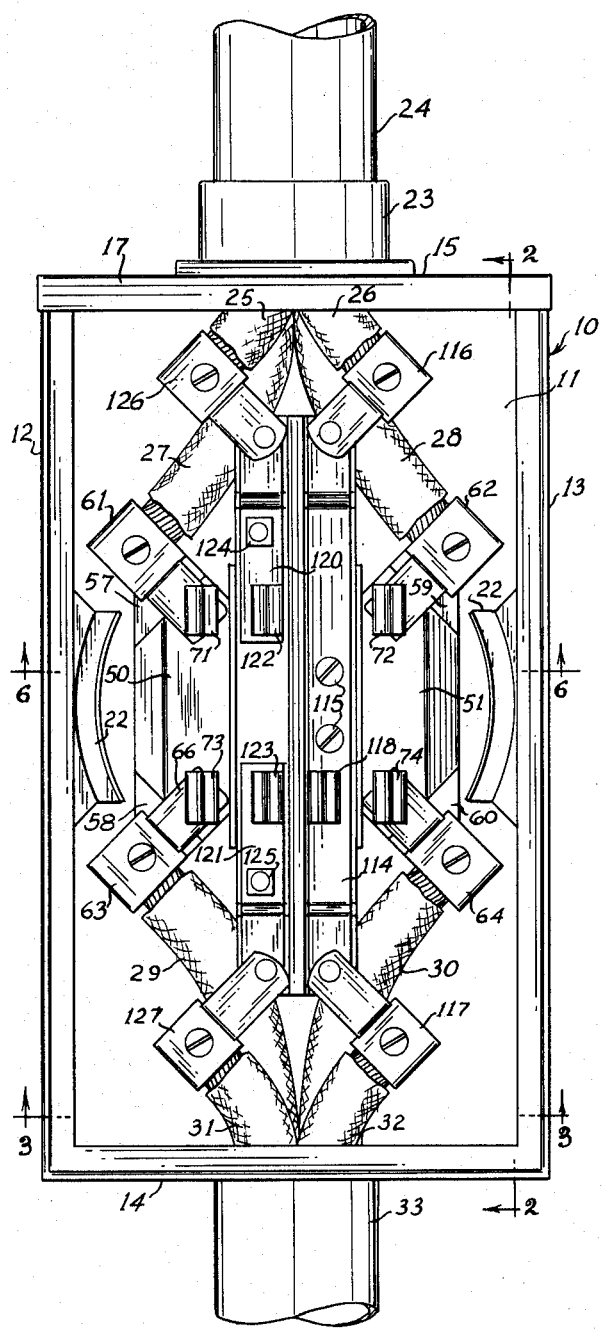
FIG. 1 is a front view of a meter socket assembly constructed in accordance with the present invention, the cover of the meter box and meter being removed.

Referring now in detail to the embodiment chosen for the purpose of illustrating the present invention, it being understood that in its broader aspects the present invention is not limited to the exact details herein depicted, numeral 10 denotes, generally, the metal rectangular box of the socket assembly. The box 10 is provided with a flat rectangular back 11, sides 12 and 13 and ends 14 and 15. The sides 12 and 13 are opposed and parallel to each other and the ends are opposed and parallel to each other. The outer or forward edges of the sides 12 and 13 as well as the forward edge of end 14 are in a plane parallel to back 11 so as to receive thereon the cover plate 16, seen in FIG. 4. The end 15 projects beyond the forward plane of these forward edges so as to provide an overlapping flange 17 which receives the upper edge of cover plate 16.

The arrangement is such that the meter 18 projects through a central hole 19 in cover plate 16, the cover plate 16 urging the base ring 20 of meter 18 inwardly so that the blades or spades 21 on the inner surface of meter 18 are received in their respective jaws, as the ring 20 rests against the arcuate inwardly directed centering flanges 22 of the sides 12 and 13.

Centrally on the upper end 15 of box 10 is a flange member 23 which has a central opening aligned with the central opening of upper end 15 so as to be perpendicular to the plane of end 15. The flange member 23 is provided with internal threads which receive the externally threaded end of the upper conduit 24, the conduit 24 being a hollow cylindrical member carrying a plurality of cables, for example, four cables 25, 26, 27 and 28. These cables are relatively inflexible members which protrude within the box 10 as shown in FIG. 1.

It will be understood by those skilled in the art that when the meter socket assembly of the present invention is connected in a circuit, a plurality of cables 29, 30, 31 and 32 carried within a conduit 33 leads through the bottom end 14 to the various electrical equipment (such as a fuse box not shown). The conduits 24 and 33 are coaxial, aligned complementary pipes which carry the various cables, two cables outwardly and two cables inwardly. In the present embodiment, the outer cables are cables 25 and 26 of conduit 24 and cables 31 and 32 of conduit 33, and the inner cables are cables 27, 28, 29 and 30.

Secured centrally to the back 11 of box 10 is a mounting base or plate 35, best seen in FIG. 6. The plate 35 is spaced outwardly or forwardly of back 11 by a pair of opposed brackets 36 and 37 provided with outwardly turned flanges 38 and 39, also seen in FIG. 6, so that the plate 35 is parallel to and forward of back 11.

On the forward surface of mounting plate 35 is a rectangular stamped brace member 40 which provides a plurality of upstanding securing lugs, such as outer lugs 41 and 42 spaced from plate 35. On brace member 40 there are inner lugs 43 and 44 which, in prior art devices, function to support the Z-shaped ground bars (not shown). In the present embodiment, the lugs 43 and 44 serve no useful purpose.

The outer lugs 41 and 42 respectively carry a pair of complementary insulator terminal supporting blocks 50 and 51. These primary blocks 50 and 51 are formed of non-conducting or insulating material such as porcelain or some other ceramic or plastic material and are provided with flat, longitudinally disposed, opposed, parallel inner walls or surfaces 52 and 53. Recesses 54 and 54' are provided through the outer portions of blocks 50 and 51 so as to receive therein the bolts 55 and 56 which project through appropriate apertures in blocks 50 and 51 and threadedly engage the outer lugs 41 and 42.

At the outer corners of blocks 50 and 51 are the diverging ledges 57, 58 and 59, 60, the back surfaces of which lie about parallel to the front surface of plate 35. The forward portions of ledges 57, 58, 59 and 60 form cradles which support the inner jaws of primary terminals 61, 62, 63 and 64. Each primary terminal 61, 62, 63 or 64 is arranged at about a 45° angle from the center line of box 10 and lies in a plane forward of and parallel to plate 35, and aligned with the inner cables 27, 28, 29 and 30.

Each terminal, such as terminals 61, 62, 63 and 64, is a clamp for receiving the end of a cable and includes, for example, as seen in FIG. 3, a lower jaw 65 which is an outwardly opening U-shaped member, one arm of which is provided with a terminal platform 66 extending outwardly from the arm, and the other arm of which includes an oppositely extending lip 67. The inner surface of said one arm contains a groove which receives one end of the other jaw member 68. The upper jaw member 68 is an L-shaped member having a slot through which the lip 67 protrudes as the end of the L-shaped member or jaw 68 is received in the groove. Each terminal also includes a set screw 69 which threadedly projects through the jaw member 68 so as to urge the end of the cable into engagement with the lower jaw member 65.

The platforms of terminals 61, 62, 63 and 64, such as platform 66, lie in the same plane parallel to plate 35 and are secured to the outer surfaces of the insulator blocks 50 and 51, the platforms of terminals 61 and 63 being secured to block 50 and the terminals 62 and 64 being secured to block 51. Thus, terminals 61 and 64 are aligned along one 45° diagonal passing through the lateral center line of box 10 and terminals 62 and 63 are aligned along another 45° diagonal intersecting the other diagonal at the lateral center line of box 10.

It will be observed that the upper and lower jaws of each of terminals 61, 62, 63 and 64, such as upper jaw 68 and lower jaw 65, provide a central opening which is perpendicular or normal to the longitudinal center line of each terminal. Thus, each of the central openings of the terminals 61, 62, 63 and 64 is perpendicular to the diagonals along which its terminal is disposed, the central openings of terminals 61, 62, 63 and 64 lying in a transverse plane parallel to plate 35. In other words, the inner terminals have openings which are tangential to a circle approximately the diameter of ring 20. Therefore, the spreading of cable 27 from cable 28 and the spreading of cable 29 from cable 30 in wide areas naturally arranges these inner cables so as to coincide with the openings of terminals 61, 62, 63 and 64 and so as to be received therein.

The platforms, such as platform 66 of the terminals 61, 62, 63 and 64, are provided respectively with outwardly protruding conductor jaws 71, 72, 73 and 74 which are adapted to receive certain of the spades 21 of meter 18. As seen in FIG. 1, the openings of jaws 71 and 73 are aligned vertically and the openings of jaws 72 and 74 are aligned vertically. The jaws 71 and 72 are aligned transversely, as are the jaws 73 and 74.

The mechanism thus far described, together with a ground jaw (not shown), would be sufficient for a single phase 220 volt system meter box, the ground being readily connected to and carried by the lugs 43 and 44. To convert the single phase box thus far described into a polyphase, i.e., a three phase meter box, the attachment or adapter hereinafter described is fitted between walls 52 and 53 and secured in place against plate 35.

*Polyphase Adapter*

The attachment which I shall term a polyphase adapter is illustrated in FIG. 5. In more detail, the polyphase adapter includes a secondary insulator block denoted generally by numeral 100 which is so dimensioned as to be received between the walls 52 and 53, being slightly less wide than the distance between walls 52 and 53. Block 100 is essentially rectangular; however, the inner corners are removed to provide concaved recessed portions having arcuate or spherical surfaces 101, 102, 103 and 104. The central portion of the back surface of block 100 is recessed to provide a rectangular cavity 105 which fits over the lugs 43 and 44 while the remaining bottom portion of block 100 abuts brace member 40.

The outer surface of the block 100 includes a pair of protruding mounting pillows at opposite extremities of block 100. The mounting pillows have flat outer surfaces 106, 107 and converging opposed surfaces 108, 109 joined together by a flat intermediate surface 110. The surfaces 108, 109 and 110 define a transverse recess in the front central portion of block 100. Bisecting the outer wall, as defined by surfaces 106, 107, 108, 109 and 110, is a longitudinal central partition 111 which has a straight outer edge. Parallel to the partition 111 and formed as a thin extension of the sides of block 100 are the side plates 112 and 113. Thus it is seen that a pair of parallel troughs are provided longitudinally along the outer surface of block 100.

Within one of the aforesaid troughs and secured along surfaces 106, 108, 110, 109 and 107 is a continuous ground bus 114 which is held in place by one or a plurality of bolts 115 which pass through appropriate holes in the bus 114 and block 100 so as to threadedly engage plate 35. Thus, the bolts, such as bolt 115, secure the polyphase adapter in place and serve as a ground for the ground bus 114.

At the ends of bus 114 and extending in a diverging manner from each other are the terminals 116 and 117 which are substantially identical in construction to the terminals 61, 62, 63, 64, the terminals 116, 117 being supported by their platforms which are brazed or otherwise fixed in electrical contact with bus 114. Adjacent surface 110 a ground jaw 118 is secured to the bus 114 and extends perpendicularly therefrom.

Between partition 111 and plate 112 there are a pair of opposed, electrically disconnected or separated buses 120 and 121 which respectively extend from spaced positions along surface 110, then upward along surfaces 108 and 109, respectively, and then along surfaces 106 and 107, respectively. The inner ends of buses 120 and 121 are respectively provided with perpendicularly extending jaws 122 and 123 which terminate in the plane of the outer end of jaw 118.

At intermediate portions along buses 120 and 121 there may be provided small terminals or posts 124 and 125 from which current may be distributed to such devices as a by-pass (not shown) for the meter.

At the outer ends of buses 120 and 121 are the terminals 126 and 127, respectively, which are substantially identical to the terminals 61, 62, 63 and 64, as well as terminals 116 and 117. The terminals 116 and 126 are aligned transversely and diverging from the other at about 90°, forming 45° angles with the longitudinal center line of box 10. Likewise, terminals 117 and 127 are aligned transversely and form a 90° angle with respect to each other.

It will be seen in FIG. 1 that the distance from terminals 116, 126 to terminals 117, 127 is approximately twice the distance from terminals 61, 62 to terminals 63, 64. The distance from terminal 116 to 126 or 117 to 127 is substantially less than the distance from terminal 61 to 62 or 63 to 64. Further, the jaws 73, 74, 118 and 123 are aligned transversely and protrude so as to terminate in the same transverse plane parallel but spaced from plate 35. Likewise, the jaws 71, 122, 72 are aligned parallel to the line of jaws 73, 74, 118 and 123, these jaws 71, 122, 72 terminating in the same plane with jaws 73, 74, 118 and 123.

Figure 2:
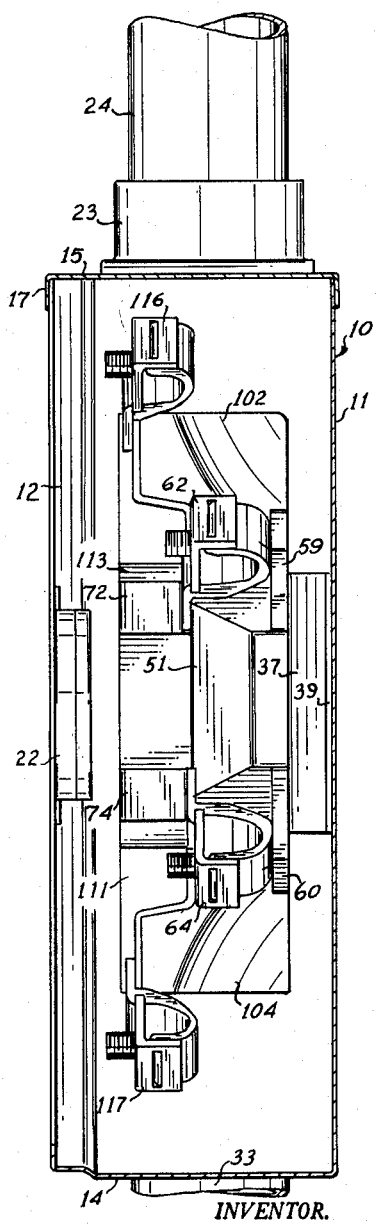
FIG. 2 is a cross sectional view taken substantially along the line 2—2 of FIG. 1.

It will be observed in FIG. 2 that the terminals of the polyphase adapter are arranged outwardly of the terminals of the primary socket by a distance equal to the diameter of the cable, such as cables 25, 26, 27, 28, 29, 30, 31 and 32. Thus, the plane of terminals 116, 117, 126 and 127 is spaced outwardly of the plane of terminals 61, 62, 63 and 64 by a distance approximately equal to the diameter of one of the cables 25, 26, 27, 28, 29, 30, 31 and 32.

It is therefore seen that with the cables 25, 26, 31 and 32 forwardly of the cables 27, 28, 29 and 30, the cables 25, 26, 31 and 32 are naturally aligned with the terminals 116, 117, 126, 127. Hence, by bending the cables 25, 26, 31, 32 outwardly about 45°, each cable is adapted to be received in its terminal, cable 25 being received in terminal 126, cable 26 being received in terminal 116, cable 31 being received in terminal 127, and cable 32 being received in terminal 117.

From the foregoing description the operation of my meter socket is apparent. With the adapter 100 removed, the socket is a single phase 220 volt socket wherein three cables are led respectively to the ground terminal (not shown) and the terminals 61 and 62, and three cables are led from the terminals 63 and 64 and ground to say a fuse box or the like. Thus the box 10 without the adapter 100 is suitable for say up to 200 ampere class service.

With the adapter in place, automatically the socket assembly is converted into a polyphase, i.e., a three phase, meter box of the seven jaw type sufficient to handle 400 ampere class service.

The wires 25, 26, 27 and 28 before entering the socket are caused to be in proper order in which to enter the terminals 126, 116, 61 and 62, otherwise the meter box would not accommodate the wires. Also, once the wires or cables 25, 26, 27 and 28 are connected in proper order, they cannot be inadvertently switched to other terminals.

Because there is no necessity for looping the cables back in the box 10, the box 10 may be shorter than the prior art boxes and the cables 25, 26, 27 and 28 may also be shorter.

Since the cables within the box 10 need only be bent slightly to be positioned for clamping contact with the respective terminals, the cables are relaxed and thus no undue stress is placed on the blocks 50, 51 and 100.

The two circles of terminals, namely terminals 116, 117, 126, 127 in the larger circle and in the outer plane and terminals 61, 62, 63 and 64 in the smaller circle and in the inner plane, cooperate to prevent both inadvertent wrong connection of cables and the stressing of the various elements to affect a connection between a cable and a terminal.

It will be obvious to those skilled in the art that many variations may be made in the embodiments chosen for the purpose of illustrating the present invention without departing from the scope thereof as defined by the appended claims.

I claim:

1. In a meter box assembly of the class having at each end a pair of transversely spaced terminals mounted on the back of a meter box and to which the ends of longitudinally extending cables through opposite ends of the box are connected, the combination therewith of an adapter removably secured to said box between said terminals, said adapter including a longitudinally extending insulator block protruding between and longitudinally beyond said transversely spaced terminals in both directions and terminals extending from opposite ends of said insulator block, said last mentioned terminals being longitudinally outward of said first mentioned terminals and supported by said insulator block in a plane forwardly of said first mentioned terminals.

2. In a meter box assembly of the class having a pair of transversely spaced insulator blocks which carry diverging terminals thereon to which the diverging ends of longitudinally extending cables through opposite ends of the box are connected, the combination therewith of a removable adapter secured to said box between said insulator blocks, said adapter including a longitudinally extending third insulator block so dimensioned that it is confined by said first mentioned insulator blocks to the space therebetween and terminals in a different transverse plane from and outwardly of said diverging terminals and connected to opposite ends of said third insulator block.

3. In a meter box assembly of the class having a pair of transversely spaced insulator blocks which carry diverging terminals thereon to which the diverging ends of longitudinally extending cables through opposite ends of the box are connected, the combination therewith of an adapter secured to said box between said insulator blocks, said adapter including a longitudinally extending third insulator block and terminals extending from opposite ends of said third insulator block, the aforesaid insulator blocks being so dimensioned that the terminals of the pair of spaced insulator blocks are in a different transverse plane from the terminals of said third insulator block, said third insulator block protruding beyond the terminals of said pair of insulator blocks so as to separate both the cables connected thereto and the terminals carried by the pair of insulator blocks.

4. In a meter box assembly of the class having a pair of transversely spaced insulator blocks on opposed sides of the central longitudinal portion of the box, said insulator blocks carrying diverging terminals thereon to which the diverging ends of longitudinally extending cables through opposite ends of the box are connected, the combination therewith of an adapter removably secured to the central portion of said box between said insulator blocks, said adapter including a longitudinally extending third insulator block, diverging terminals extending from opposite ends of said third insulator block, the aforesaid insulator blocks being so dimensioned that the terminals of the pair of spaced insulator blocks are in a different transverse plane from the terminals of said third insulator block, said terminals of said third insulator block being positioned transversely outwardly of and longitudinally beyond said terminals of said pair of insulator blocks and means for removably connecting a meter to the aforesaid terminals.

5. In a meter box assembly of the class having a pair of transversely spaced insulator blocks which carry diverging terminals thereon to which the diverging ends of longitudinally extending cables through opposite ends of the box are connected, the combination therewith of an adapter removably secured to said box between said insulator blocks, said adapter including a longitudinally extending third insulator block, diverging terminals extending from opposite ends of said third insulator block, the aforesaid insulator blocks being so dimensioned that the terminals of the pair of spaced insulator blocks are in a different transverse plane from the terminals of said third insulator block, said terminals of said third insulator block being positioned longitudinally beyond said terminals of said pair of insulator blocks, said third insulator block bisecting the incoming cables which connect to the terminals of said pair of insulator blocks, and means for removably connecting a meter to the aforesaid terminals.

6. In a meter box assembly of the type having a meter box with a pair of spaced insulator blocks carrying terminals electrically connected to spade jaws adapted to engage a meter, the combination therewith of a polyphase adapter comprising a third insulator block mounted against said box between said pair of insulator blocks, said third insulator block being provided with a transversely recessed central portion in its upper surface, spaced parallel buses extending along said upper surface, a plurality of contactor jaws extending from said buses within the recessed portion of said block, said contactor jaws terminating in about the plane of said spade jaws, and terminals extending from the ends of said block, said terminals being connected to the ends of said buses and diverging from each other.

7. A polyphase adapter comprising an insulator block having a flat lower surface for contacting a base against which said insulator block is adapted to be mounted, there being provided a transveresly recessed central portion in the upper surface of said insulator block, a partition extending longitudinally along the upper surface of said block, buses extending along said upper surface of said insulator block on both sides of said partition and parallel to each other and to said partition, a plurality of contactor jaws extending perpendicular to said lower surface from said buses within the recessed portion of said block, said jaws terminating in about the plane of said partition, and terminals extending beyond the ends of said block, said terminals being connected to the end of said buses and diverging outwardly from each other.

8. A polyphase adapter comprising an insulator block having a lower surface for contacting a base against which said insulator block is adapted to be mounted and being provided with an upper surface parallel to the lower surface, said block having a transversely recessed central portion in the upper surface, a central partition extending longitudinally along the upper surface of said block, buses extending along said upper surface on both sides of said partition, and a plurality of contactor jaws extending perpendicular to said upper surface from said buses intermediate the outer ends of said buses and within the recessed portion of said block, said partition terminating in approximately the same plane with the outer ends of said jaws and terminals protruding from the ends of said buses beyond the ends of said block, the upper surfaces of said terminals and said jaws terminating in approximately the same plane.

9. In an electrical box assembly, inner and outer pairs of incoming cables arranged parallel to each other and in parallel inner and outer transverse planes, a meter box having opposed ends and a flat back, said back being arranged parallel to the aforesaid transverse planes, the ends of said cables projecting through one of said ends of said box and into the interior thereof, a first pair of spaced diverging terminals carried by said box on opposite sides of the line of said cables and in said inner transverse plane, and a second pair of spaced diverging terminals carried by said box on opposite sides of said line of said cables and in said outer transverse plane, said second pair of terminals being between said first pair of terminals and said one of said ends, said ends of said cables curving outwardly from each other to be engaged in their respective planes by said terminals, and outlet means connected to said terminals for creating a circuit between certain of said cables.

10. In a meter box assembly of the type having a pair of transversely spaced insulator blocks within a meter box and carrying terminals electrically connected to spade jaws adapted to receive a meter, said terminals extending from the opposite ends of said blocks in diverging fashion for receiving and clamping the ends of diverging cables protruding through opposed ends of said meter box, the combination therewith of a longitudinally extending third insulator block disposed between said pair of blocks and separating the terminals of one of said pair of insulator blocks from the terminals of the other of said pair of insulator blocks, said third insulator block having recesses at its corner portions for cradling said cables longitudinally outwardly of said terminals, additional diverging terminals disposed longitudinally outwardly of the first mentioned terminals and in a plane forwardly of said first mentioned terminals, said additional terminals being disposed transversely between the first mentioned terminals, said third insulator block having a recessed front portion and a jaw carried within said recessed front portion and electrically connected to one of said additional terminals.

11. In a meter box assembly of the class having a box and a cover for the front of said box, said box having a top and a bottom provided with aligned apertures on a vertical axis through which conduits each having four cables protrude to terminate within said box and a back, the combination therewith of insulator means disposed in said box and secured to said back, an upper group of four terminals projecting upwardly from one end of said insulator means toward said aperture of said top for respectively receiving the cables of one of said conduits, a lower group of four terminals projecting downwardly from the other end of said insulator means toward the aperture of said bottom for respectively receiving the cables of the other of said conduits, jaws connected to said terminals for receiving the spades of an electrical watt hour meter extending through said cover, said terminals having at their outer end portions clamping means with openings for receiving and holding the end portions of said cables, said terminals being symmetrically disposed, two terminals of said upper group and two terminals of said lower group being disposed on one side of said vertical axis, the other two terminals of said upper group and the other two terminals of said lower group being disposed on the other side of said vertical axis, said upper and lower groups being disposed to provide outer and inner pairs of spaced terminals in each of said groups, the inner pair of terminals in each of said groups being disposed in the same transverse plane with each other and equally spaced from said vertical axis, the outer pair of terminals in each of said groups being disposed in the same transverse plane and being equally spaced from said vertical axis by amounts greater than the amounts by which the terminals of the inner pairs of terminals are spaced from the vertical axis, the terminals of the outer pairs of terminals diverging from each other as they extend outwardly from said insulator means, the terminals of the inner pairs of terminals also diverging from each other as they extend outwardly from said terminal means, whereby the openings of said terminals when receiving the end portions of said cables hold said cables flexed outwardly from said vertical axis, said inner and outer pairs of terminals in said upper group of terminals being spaced from said top, said outer pair of terminals in said upper group of terminals being spaced from said top by an amount greater than the spacing from said top of said inner pair of terminals in said upper group, said inner and outer pairs of terminals in said lower group of terminals being spaced from the bottom of said box, said outer pair of terminals in said lower group of terminals being spaced from said bottom by an amount greater than the spacing from said bottom of said inner pair of terminals in said lower group.

(References on following page)

References Cited in the file of this patent

UNITED STATES PATENTS

| | | |
|---|---|---|
| Re. 24,705 | Moore | Sept. 29, 1959 |
| 2,051,856 | Hubbell | Aug. 25, 1936 |
| 2,214,065 | Pennock et al. | Sept. 10, 1940 |
| 2,626,309 | Road et al. | Jan. 20, 1953 |
| 2,738,484 | Benander | Mar. 13, 1956 |
| 2,838,626 | Kuhn | June 10, 1958 |

OTHER REFERENCES

Electrical World, Aug. 18, 1958, page 86. (Copy in Scientific Library.)